US012036894B2

(12) United States Patent
Tseng et al.

(10) Patent No.: US 12,036,894 B2
(45) Date of Patent: Jul. 16, 2024

(54) SEAT ADJUSTMENT (71) Applicant: Ford Global Technologies, LLC, Dearborn, MI (US)

(72) Inventors: Fling Finn Tseng, Ann Arbor, MI (US); Himanshu Verma, Farmington Hills, MI (US); Swati Johar Rawat, Mississauga (CA); Kalyani Purushottam Sonawane, Plymouth, MI (US); Johannes Geir Kristinsson, Ann Arbor, MI (US); Alex Perkins, Detroit, MI (US); Patrick Maloney, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 453 days.

(21) Appl. No.: 17/496,886

(22) Filed: Oct. 8, 2021

(65) Prior Publication Data
US 2023/0113821 A1    Apr. 13, 2023

(51) Int. Cl.
*B60R 16/037* (2006.01)
*B60N 2/00* (2006.01)
*B60N 2/02* (2006.01)

(52) U.S. Cl.
CPC .......... *B60N 2/002* (2013.01); *B60N 2/0244* (2013.01); *B60R 16/037* (2013.01); *B60N 2/0268* (2023.08)

(58) Field of Classification Search
CPC .... B60N 2/002; B60N 2/0244; B60N 2/0268; B60R 16/037
See application file for complete search history.

(56) References Cited

U.S. PATENT DOCUMENTS

| 10,507,774 | B2 | 12/2019 | Liongosari et al. |
| 2010/0036567 | A1 | 2/2010 | Gandhi |
| 2017/0349061 | A1 | 12/2017 | Benson et al. |
| 2020/0079385 | A1 | 3/2020 | Beaurepaire et al. |
| 2020/0156439 | A1 | 5/2020 | Chen et al. |
| 2020/0180534 | A1 | 6/2020 | Kohler et al. |
| 2021/0011437 | A1 | 1/2021 | Migneco et al. |

FOREIGN PATENT DOCUMENTS

| CN | 105334066 B | 8/2018 |
| EP | 1092134 B1 | 1/2003 |
| EP | 3215402 B1 | 12/2019 |

OTHER PUBLICATIONS

Notice of Allowance for U.S. Appl. No. 17/120,676 as issued by the USPTO dated Dec. 9, 2022.

*Primary Examiner* — Mathew Franklin Gordon
(74) *Attorney, Agent, or Firm* — Vichit Chea; Bejin Bieneman PLC (57) ABSTRACT

A profile for an occupant is stored. The profile includes a plurality of clusters of sitting positions for the occupant in a seat and classifications of respective clusters as preferred or nonpreferred. Respective clusters are classified as preferred or nonpreferred based on sitting scores for the respective sitting positions in that cluster. A higher sitting score increases a likelihood of the classification being preferred. A series of pressure maps indicating a respective series of sitting positions of the occupant in the seat are received. The pressure maps include a current pressure map. One of the sitting positions is assigned to one of the clusters that is classified as preferred in response to the sitting score of that sitting position being greater than a threshold score. A physical configuration of the seat is adjusted in response to the current sitting position being in one of the clusters that is classified as nonpreferred.

20 Claims, 7 Drawing Sheets

SEAT ADJUSTMENT

BACKGROUND

Vehicles typically include a passenger cabin to house occupants of the vehicle. The passenger cabin typically includes one or more front seats disposed at a front of the passenger cabin, one or more back seats disposed behind the front seats, and possibly third-row seats at a rear of the passenger cabin. A seat can include a seat back, a seat bottom, and a head restraint. The seat back, the seat bottom, and/or the head restraint are often adjustable in multiple degrees of freedom.

DETAILED DESCRIPTION

A system includes a computer including a processor and a memory, the memory storing instructions executable by the processor to store a profile for an occupant. The profile includes a plurality of clusters of sitting positions for the occupant in a seat, and classifications of respective clusters as preferred or nonpreferred. The instructions further include instructions to classify respective clusters as preferred or nonpreferred based on sitting scores for the respective sitting positions in that cluster. A higher sitting score increases a likelihood of the classification being preferred. The instructions further include instructions to receive a series of pressure maps indicating a respective series of sitting positions of the occupant in the seat. The pressure maps include a current pressure map. The instructions further include instructions to assign one of the sitting positions to one of the clusters that is classified as preferred in response to the sitting score of that sitting position being greater than a threshold score. The instructions further include instructions to adjust a physical configuration of the seat in response to a current sitting position being in one of the clusters that is classified as nonpreferred.

The instructions can further include instructions to determine the sitting scores for the respective sitting positions based on occupant input data.

The instructions can further include instructions to request the occupant input based on expiration of a timer.

The instructions can further include instructions to request the occupant input based on detecting the current sitting position has changed.

The instructions can further include instructions to predict one of the clusters into which the cluster including the current sitting position is most likely to transition based on one of a matrix of probabilities of transition from respective clusters into respective other clusters or cluster similarity measures between the cluster including the current sitting position and respective other clusters. The matrix is based on the series of pressure maps. The instructions can further include instructions to adjust the configuration of the seat based on the predicted one of the clusters.

The instructions can further include instructions to, in response to the current sitting position being in one of the clusters that is classified as preferred, predict that cluster will be nonpreferred after a period of time based on a survival function for that cluster. The survival function determines a probability that that cluster will be preferred after the period of time. The instructions can further include instructions to adjust the configuration of the seat based on the prediction.

The period of time may specify an amount of time that the occupant has remained in the current sitting position. The period of time may specify an amount of time that the occupant has remained in one or more sitting positions in the cluster including the current sitting position. The period of time may specify an amount of time that the occupant has remained in the seat.

The instructions can further include instructions to combine two clusters into a single cluster based on overlap between the two clusters and the two clusters having a same classification.

The instructions can further include instructions to assign each of the series of sitting positions into one of the clusters based on similarity measures between that sitting position and each of the clusters.

The instructions can further include instructions to, in response to none of the similarity measures between one of the sitting positions and each of the clusters being above a threshold similarity, create a new cluster and assign that sitting position into the new cluster.

The clusters may be based on the sitting positions of a plurality of other occupants. The instructions can further include instructions to determine a plurality of features of the occupant, and the clusters may be based only on the sitting positions of the occupant and other occupants having the same features as the occupant. The features may include a vehicle type in which the respective occupants were sitting in the sitting positions. The features may include demographic information about the occupants.

The clusters may be based at least in part on the sitting positions of the other occupants until a collection distance or collection time of the series of pressure maps of the occupant increases above a respective distance threshold or time threshold, after which the clusters may be based wholly on the series of sitting positions of the occupant.

A system includes a seat having a physical configuration that is adjustable and a computer communicatively coupled to the seat. The computer is programmed to store a profile for an occupant. The profile includes a plurality of clusters of sitting positions for the occupant in a seat, and classifications of respective clusters as preferred or nonpreferred. The computer is further programmed to classify respective clusters as preferred or nonpreferred based on sitting scores for the respective sitting positions in that cluster. A higher sitting score increases a likelihood of the classification being preferred. The computer is further programmed to receive a series of pressure maps indicating a respective series of sitting positions of the occupant in the seat. The pressure maps include a current pressure map. The computer is further programmed to assign one of the sitting positions to one of the clusters that is classified as preferred in response to the sitting score of that sitting position being greater than a threshold score. The computer is further programmed to adjust a physical configuration of the seat in response to a current sitting position being in one of the clusters that is classified as nonpreferred.

The physical configuration may include at least one of a tilt of the seat, a height of the seat, a recline angle of the seat, a lumbar support position of the seat, or a fill level of a bladder supported by the seat.

A method includes storing a profile for an occupant The profile includes a plurality of clusters of sitting positions for the occupant in a seat, and classifications of respective clusters as preferred or nonpreferred. The method further includes classifying respective clusters as preferred or nonpreferred based on sitting scores for the respective sitting positions in that cluster. A higher sitting score increases a likelihood of the classification being preferred. The method further includes receiving a series of pressure maps indicating a respective series of sitting positions of the occupant in the seat. The pressure maps include a current pressure map. The method further includes assigning one of the sitting positions to one of the clusters that is classified as preferred in response to the sitting score of that sitting position being greater than a threshold score. The method further includes adjusting a physical configuration of the seat in response to a current sitting position being in one of the clusters that is classified as nonpreferred.

Further disclosed herein is a computing device programmed to execute any of the above method steps. Yet further disclosed herein is a computer program product, including a computer readable medium storing instructions executable by a computer processor, to execute an of the above method steps.

With reference to the Figures, a computer 102 of a vehicle 100 includes a processor and a memory storing instructions executable by the processor to store a profile for an occupant. The profile includes a plurality of clusters of sitting positions for the occupant in a seat 106 and classifications of respective clusters as preferred or nonpreferred. The instructions further include instructions to classify respective clusters as preferred or nonpreferred based on sitting scores for the respective sitting positions in that cluster. A higher sitting score increases a likelihood of the classification being preferred. The instructions further include instructions to receive a series of pressure maps 104 indicating a respective series of sitting positions of the occupant in the seat 106. The pressure maps 104 include a current pressure map 104. The instructions further include instructions to assign one of the sitting positions to one of the clusters that is classified as preferred in response to the sitting score of that sitting position being greater than a threshold score. The instructions further include instructions to adjust a physical configuration of the seat 106 in response to the current sitting position being in one of the clusters that is classified as nonpreferred.

The computer 102 can configure the seat 106 in a way that the occupant finds suitable, e.g., comfortable, and in a way that encourages the occupant to use a sitting position that the occupant finds suitable. The profile can keep track of multiple sitting positions that the occupant finds suitable, and the profile can update over time as the preferences of the occupant change.

Figure 1:
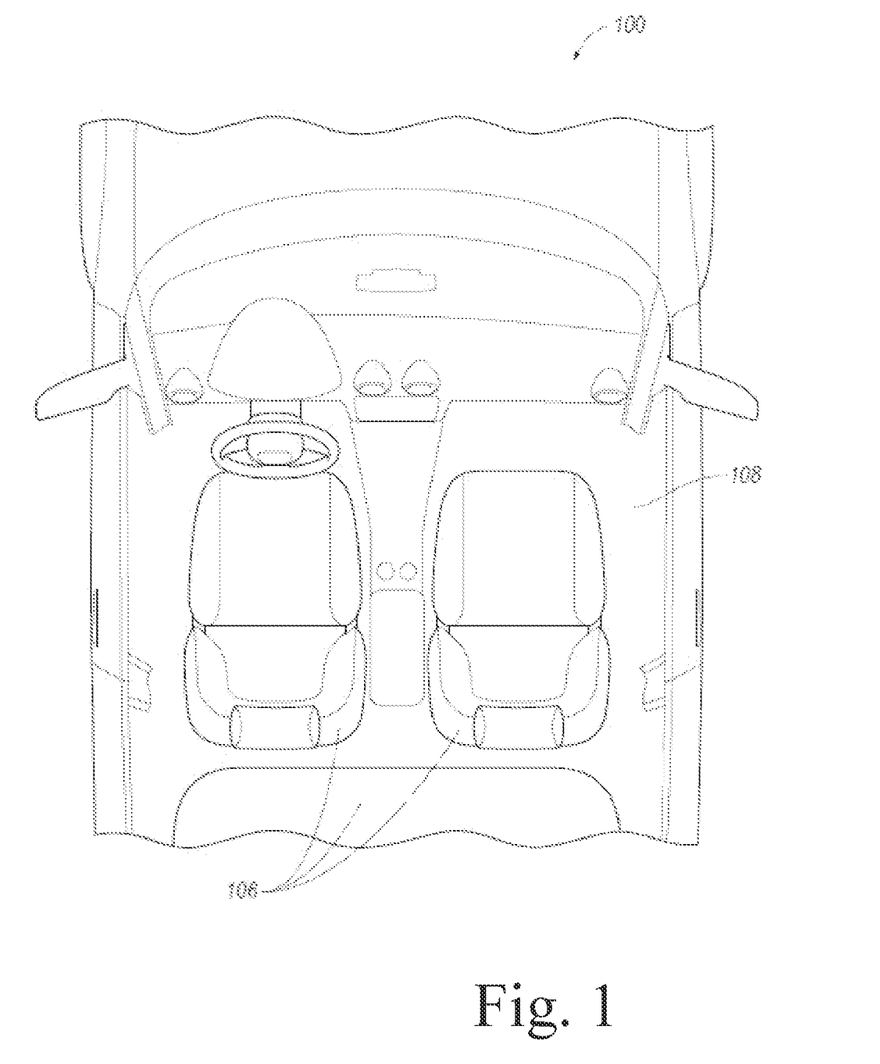
FIG. 1 is a top view of an example vehicle with a passenger cabin exposed for illustration.

With reference to FIG. 1, the vehicle 100 may be any suitable type of automobile, e.g., a passenger or commercial automobile such as a sedan, a coupe, a truck, a sport utility, a crossover, a van, a minivan, a taxi, a bus, etc. The vehicle 100, for example, may be autonomous. In other words, the vehicle 100 may be autonomously operated such that the vehicle 100 may be driven without constant attention from a driver, i.e., the vehicle 100 may be self-driving without human input.

The vehicle 100 includes a passenger cabin 108 to house occupants, if any, of the vehicle 100. The passenger cabin 108 includes one or more front seats 106 disposed at a front of the passenger cabin 108 and one or more back seats 106 disposed behind the front seats. The passenger cabin 108 may also include third-row seats 106 (not shown) at a rear of the passenger cabin 108. In FIG. 1, the front seats 106 are shown to be bucket seats and the back seats 106 are shown to be bench seats, but the seats 106 may be other types.

Figure 2:
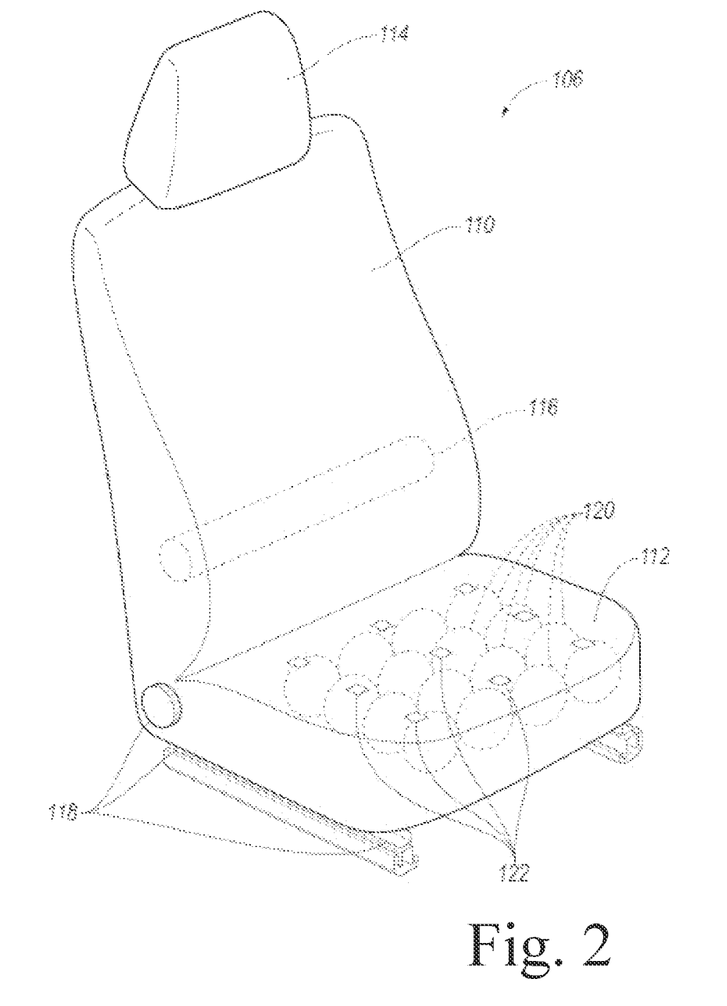
FIG. 2 is a perspective view of a seat of the vehicle.

With reference to FIG. 2, the seat 106 occupied by the occupant can include a seat back 110, a seat bottom 112, and a head restraint 114. The head restraint 114 may be supported by the seat back 110 and may be stationary or movable relative to the seat back 110. The seat back 110 may be supported by the seat bottom 112 and may be stationary or movable relative to the seat bottom 112. The seat back 110, the seat bottom 112, and/or the head restraint 114 may be adjustable in multiple degrees of freedom. Specifically, the seat back 110, the seat bottom 112, and/or the head restraint 114 may themselves be adjustable, in other words, adjustable components within the seat back 110, the seat bottom 112, and/or the head restraint 114, and/or may be adjustable relative to each other.

The seat 106 has a physical configuration that is adjustable. The physical configuration is a combination of positions or settings of the adjustable components, e.g., the seat back 110, the head restraint 114, the seat bottom 112, armrests, etc., of the seat 106. The physical configuration includes at least one of a tilt of the seat 106, a height of the seat 106, a recline angle of the seat 106, or a lumbar support position of the seat 106. The tilt of the seat 106 is an angle of the seat bottom 112 relative to the passenger cabin 108 about a lateral axis, i.e., a pitch of the seat bottom 112. The height of the seat 106 is a vertical distance of a reference point on the seat bottom 112 relative to the passenger cabin 108. The recline angle of the seat 106 is an angle of the seat back 110 relative to the seat bottom 112. The lumbar support position is a vehicle-forward position of a lumbar support bar 116, located in the seat back 110, relative to the seat back 110. Additionally, or alternatively, the seat 106 may be adjustable in other degrees of freedom.

The seat 106 includes a plurality of seat actuators 118 that adjust the positions or settings of the components of the seat 106. For example, the seat actuators 118 can include a rotary actuator to recline the seat back 110 relative to the seat bottom 112, linear actuators underneath a front and rear of the seat bottom 112 to lift or lower the front or rear of the seat bottom 112 to adjust the height and tilt of the seat 106, and a linear actuator in the seat back 110 to adjust the position of the lumbar support bar 116.

The seat bottom 112 and possibly the seat back 110 can include a plurality of bladders 120. The bladders 120 are flexible bags fillable with fluid (liquid or gas). The bladders 120 can be arranged in a plane generally parallel to the seat bottom 112, e.g., in horizontally arranged rows. The bladders 120 each have a fill level, which is a quantity of fluid in the respective bladder 120. The bladders 120 can be supplied by a compressor or pump and valves (not shown) for the respective bladders 120. The physical configuration can include the fill levels of the respective bladders 120.

The seat 106 includes a plurality of pressure sensors 122 arranged across the seat bottom 112. The pressure sensors 122 can be any suitable type for measuring a pressure exerted by the occupant at the respective points at which the pressure sensors 122 are located, e.g., strain gauge, piezoelectric, etc. The pressure sensor 122 can be arranged in, e.g., a grid pattern.

Figure 3:
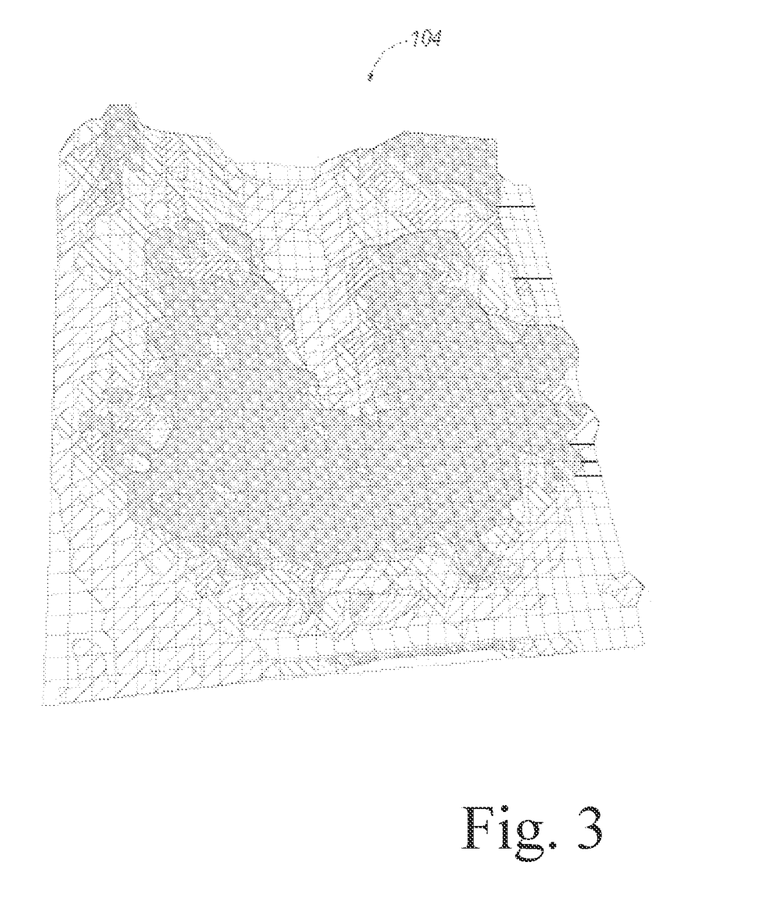
FIG. 3 is a pressure map representing a sitting position of an occupant in the seat.

With reference to FIG. 3, data from the pressure sensors 122 can collectively provide input to generate the pressure map 104. Data from the pressure sensors 122 can be filtered, e.g., according to known data processing techniques, which can assist in generating a clearer pressure map 104, e.g., by removing noise from the data, and can reduce computational resources required to process the data to generate the pressure map 104. For the purposes of this document, a "pressure map" is a set of positions and values for pressures measured at the respective positions at the same time. Each value of pressure in the pressure map 104 can be detected by one of the pressure sensors 122. For example, positions of the pressure sensors 122 on the seat bottom 112 can be represented by two-dimensional coordinates (x, y), with x representing a longitudinal position, i.e., along a vehicle-forward axis, and y representing a lateral position, i.e., along a vehicle-leftward axis. The pressure map 104 includes a value for a pressure at each position. In this example, the unit of measurement for pressure is force per area, e.g., MPa. FIG. 3 depicts the positions (x, y) along two horizontal axes and the values for pressure represented by vertical height and shading. The pressure map 104 can be organized in various ways. For example, if the pressure sensors 122 are arranged in an n×m grid, the pressure map 104 can be organized as a vector in which each entry in the vector is the value for pressure at one of the positions, e.g., $<p_1, p_2, \ldots, p_n, p_{n+1}, p_{n*m}>$, in which $p_1$ is the value for pressure at $(x_1, y_1)$, $p_2$ at $(x_2, y_1)$, $p_n$ at $(x_n, y_1)$, $p_{n+1}$ at $(x_1, y_2)$, $p_{n*m}$ at $(x_n, y_m)$.

A pressure map 104 is a record of a sitting position of an occupant. Sitting positions are arrangements of the body of the occupant; for example, the occupant can have their weight centered or shifted more toward one side, can be leaning back or forward, can have their thighs raised or lowered, etc. Respective sitting positions can be defined by correspondingly different pressure maps 104. For example, in the pressure map 104 in FIG. 3, the occupant has their weight centered laterally and shifted more toward the rear, with their left thigh lifted compared to their right thigh.

Figure 4:
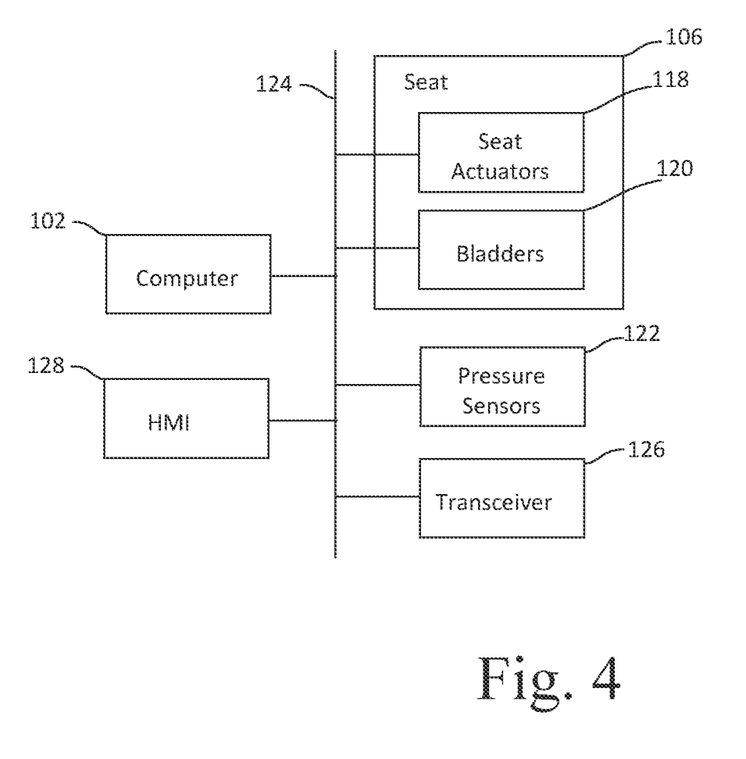
FIG. 4 is a block diagram of a system for the seat.

With reference to FIG. 4, the computer 102 is a microprocessor-based computing device, e.g., a generic computing device including a processor and a memory, an electronic controller or the like, a field-programmable gate array (FPGA), an application-specific integrated circuit (ASIC), etc. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided. The computer 102 can be multiple computers coupled together.

The computer 102 can transmit and receive data through a communications network 124 such as a controller area network (CAN) bus, Ethernet, WiFi, Local Interconnect Network (LIN), onboard diagnostics connector (OBD-II), and/or by any other wired or wireless communications network. The computer 102 may be communicatively coupled to the seat 106 (i.e., the seat actuators 118 and/or the bladders 120), the pressure sensors 122, a transceiver 126, and other components via the communications network 124.

The transceiver 126 may be adapted to transmit signals wirelessly through any suitable wireless communication protocol, such as Bluetooth®, WiFi, IEEE 802.11a/b/g, other RF (radio frequency) communications, etc. The transceiver 126 may be adapted to communicate with a remote server, that is, a server distinct and spaced from the vehicle 100. The remote server may be located outside the vehicle 100. For example, the remote server may be associated with another vehicle (e.g., V2V communications), an infrastructure component (e.g., V2I communications via Dedicated Short-Range Communications (DSRC) or the like), an emergency responder, a mobile device associated with the owner of the vehicle 100, etc. The transceiver 126 may be one device or may include a separate transmitter and receiver.

The vehicle 100 further includes a human-machine interface (HMI) 128. The HMI 128 includes occupant input devices such as knobs, buttons, switches, pedals, levers, touchscreens, and/or microphones, etc. The input devices may include sensors to detect occupant inputs and provide occupant input data to the computer 102. That is, the computer 102 may be programmed to receive occupant input from the HMI 128. The occupant may provide each occupant input via the HMI 128, e.g., by selecting a virtual button on a touchscreen display, by providing voice commands, etc. For example, a touchscreen display included in an HMI 128 may include sensors to detect that an occupant selected a virtual button on the touchscreen display to, e.g., specify a sitting score (as discussed below), which input can be received in the computer 102 and used to assign a sitting position to a cluster, as discussed below.

The HMI 128 typically further includes output devices such as displays (including touchscreen displays), speakers, and/or lights, etc., that output signals or data to the occupant. The HMI 128 is coupled to the vehicle communications network 124 and can send and/or receive messages to/from the computer 102 and other vehicle sub-systems.

The computer 102 stores, e.g., in a memory, a profile for each of a plurality of potential occupants. Each profile can include a plurality of clusters of the sitting positions, classifications of the clusters as preferred or nonpreferred, and a matrix of probabilities of transition from respective clusters into respective other clusters, as each described in more detail below.

A cluster in the context of this document is a grouping of similar sitting positions of the occupant. Similar sitting positions are sitting positions that are sufficiently close to each other that typically occupants perceive that they are the effectively the same. Similar sitting positions can be determined by empirical testing with a plurality of test occupants, for example. As described below, the sitting positions are organized into the clusters by machine learning, e.g., unsupervised learning. Different measures of similarity can be used for the machine learning, as described below, e.g., Kullback-Leibler divergence, cosine similarity, etc. Each cluster includes sitting positions that feel similar to the occupant. The clusters can be represented by their centroids (as described below) or by prototypes, i.e., data points (in this case the pressure maps 104) that represent respective clusters. Each cluster is classified as preferred or nonpreferred, i.e., whether the occupant prefers to sit in the sitting positions in the cluster or not.

The profile can include the matrix T of probabilities of transition from respective clusters into respective other clusters.

$$T = \begin{bmatrix} 0 & p_{21} & \cdots & p_{N1} \\ p_{12} & 0 & & p_{N2} \\ \vdots & & \ddots & \vdots \\ p_{1N} & p_{2N} & \cdots & 0 \end{bmatrix}$$

The matrix is an N×N matrix, in which N is the number of clusters in the profile. The columns can represent a current cluster that the occupant is sitting in, and the rows can represent a next cluster that the occupant will sit in (or vice versa); i.e., the value $p_{ij}$ in the ith column and jth row is a probability of transitioning next to the jth cluster, given that the occupant is currently in the ith cluster. The probability $p_{ii}$ of transitioning from a cluster into the same cluster is defined to be zero. Each column sums to 1. As described below, the matrix T is based on the series of pressure maps 104 from the occupant's sitting positions.

The computer 102 can select a profile based on identifying an occupant in the vehicle. For example, the occupant can use a key fob to start the vehicle 100, and the key fob has an RFID tag or the like uniquely specifying the occupant from among other potential occupants who regularly use the vehicle 100. The RFID signal can be associated with the occupant in memory. For another example, a mobile phone or device of the occupant can pair with, e.g., the HMI 128. The mobile phone or device can be associated with the occupant in memory. For another example, the computer 102 can receive data from an internal camera having a field of view including a face of the occupant and can identify the occupant using image-recognition techniques as are known. For another example, the occupant can enter identifying information such as a username and password into the HMI 128.

Upon identifying the occupant, the computer 102 determines a plurality of features of the occupant. An occupant feature is a fact specific to the occupant. For example, the features can include demographic information about the occupant, e.g., height, weight, age, gender, state of residence, etc. The computer 102 can determine the demographic information based on, e.g., user input specifying the demographic information, processing sensor data, such as pressure sensor 122 data, image data, etc., e.g., according to known image processing techniques, etc. The demographic information can be stored in memory and associated with the profile of the occupant. For another example, the features can include a type of the vehicle 100 in which the occupant is sitting. The computer 102 can store the type of the vehicle 100 in which it is installed in memory. A type of vehicle, as used herein, is a classification or category of vehicle having common features. A feature of a vehicle herein means a physical attribute of the vehicle, e.g., shape, size (i.e., dimensions), make, model, etc.

The computer 102 determines whether sufficient data about the sitting positions of the occupant have been collected for the profile to be based on only the occupant's data. For example, the computer 102 can determine whether a collection distance, i.e., a number of miles that the vehicle 100 has traveled while recording the sitting positions of the occupant, has increased above a distance threshold. The distance threshold can be chosen to be sufficiently long that the computer 102 is no longer collecting new sitting positions. For another example, the computer 102 can determine whether a collection time, i.e., a collective duration during which the vehicle 100 has traveled while recording the sitting positions of the occupant, has increased above a time threshold. The time threshold can be chosen to sufficiently long that the computer 102 is no longer collecting new sitting positions.

Upon determining sufficient data has not been gathered, the computer 102 loads a profile for the occupant having clusters of the sitting positions of the occupant and the sitting positions of a plurality of other occupants. The clusters can be based on the sitting positions of only other occupants having the same features as the occupant, e.g., a same vehicle type and same demographic information. The sitting positions in the profile can be sorted into clusters using unsupervised learning, e.g., known algorithms such as k-means, hierarchical aggregation, self-organizing feature maps, etc. The computer 102 can pull clusters of occupants having the same features as the occupant from a remote server using the transceiver 126. Using sitting positions from other occupants having the same features can provide a good estimate of what the preferences of the occupant are likely to be in the situation in which there is insufficient data about the occupant.

Upon determining insufficient data has been gathered, the computer 102 loads a profile for the occupant having clusters based wholly on the sitting positions of the occupant, i.e., not on any other occupants. The sitting positions in the profile can be sorted into clusters using unsupervised learning, e.g., known algorithms such as k-means, hierarchical aggregation, self-organizing feature maps, etc.

The computer 102 classifies each cluster in the loaded profile as preferred or nonpreferred. The computer 102 can use a machine-learning algorithm for classifying items into a known number of categories, e.g., naive Bayesian, nearest neighbor, polynomial classifiers, artificial neural networks, etc. Inputs to the machine-learning algorithm can include sitting scores for the respective sitting positions in the same cluster. A greater sitting score increases a likelihood of the classification being preferred.

The clusters can be classified based on a cluster score. A cluster score, as that term is used herein, is a numerical value, e.g., an integer, that represents a comfort level for a cluster. The cluster score can be determined by combining, e.g., by averaging and/or some other statistical measure, sitting scores for the respective sitting positions in the cluster. For example, if a cluster score is greater than or equal to a threshold score, then the cluster can be classified as preferred, and if the cluster score is less than the threshold score, then the cluster can be classified as nonpreferred. The threshold score can be determined empirically, e.g., based on testing that allows for determining a minimum score at which occupants remain comfortable in a seat 106.

A sitting score, as that term is used herein, is a numerical value, e.g., an integer, that represents a comfort level for a sitting position at a given sitting time (as discussed below). Sitting scores are typically provided on a specified scale, and a cluster score determined from a plurality of sitting scores will likewise typically fall within that scale. As one example, a score can be an integer on a scale from 1 to 10, inclusive. In this example, a score of 1 represents a least comfortable sitting position, and a score of 10 represents a most suitable, e.g., comfortable, sitting position. In other words, a higher sitting score indicates that the occupant prefers, i.e., most or more often assumes, the sitting position, and a lower sitting score indicates that the occupant does not prefer the sitting position.

To determine the sitting score, the computer 102 can be programmed to actuate the HMI 128 to output a request for the occupant to specify a sitting score for the sitting position. In this situation, the computer 102 can actuate the HMI 128 to display virtual buttons that the occupant can select to specify a sitting score for the sitting position. In other words, the HMI 128 may activate sensors that can detect the occupant selecting a virtual button associated with a sitting score. That is, the HMI 128 can detect an occupant input specifying a sitting score for the sitting position. Upon detecting the occupant input, the HMI 128 can provide the occupant input to the computer 102, and the computer 102 can assign the specified sitting score to the sitting position.

The computer 102 can request the occupant input, e.g., upon detecting the sitting position has changed (as discussed below). As another example, the computer 102 can request the occupant input based on expiration of a timer. A duration of the timer may be determined empirically based on, e.g., testing that allows for determining an average amount of time for occupants to become uncomfortable in a sitting position.

As used herein, a "sitting time" specifies an amount of time that a corresponding sitting state has occurred. For purposes of this disclosure, a "sitting state" is defined as a specific condition that can be true or false for a given time. For example, a sitting state may be determined based on the occupant remaining in the seat 106, i.e., regardless of a sitting position. As another example, a sitting state may be determined based on the occupant remaining in sitting positions in a same cluster. As another example, a sitting state may be determined based on the occupant remaining in one sitting position. Other sitting states may also be determined.

To determine the sitting time, the computer 102 can initiate respective timers based on detecting a respective sitting state, e.g., based on pressure maps 104, and can stop the timer(s) upon detecting the occupant input specifying a sitting score, e.g., via the HMI 128. That is, one or more sitting times for respective sitting states may be determined simultaneously. Prior to detecting the occupant input specifying the sitting score, the computer 102 can reset the timer(s) based on, e.g., detecting the occupant is not seated, the occupant's new sitting position is in another cluster, the occupant's sitting position has changed, etc.

Additionally, or alternatively, to classifying the clusters, the machine-learning algorithm can output survival functions for the respective clusters. A survival function is a mathematical function that approximates a cluster score for a cluster as a function of time. A survival function is determined, e.g., using known techniques, based on a cumulative distribution function, e.g., of a Weibull distribution, of a continuous random variable, e.g., cluster scores associated with respective sitting times. A cluster score can be associated with a sitting time by combining, e.g., in substantially the same manner as discussed above, sitting scores at the sitting time for the respective sitting positions in the cluster. When the respective survival function approximates an initial cluster score that is greater than or equal to threshold score and has a slope that is less than a slope threshold, the cluster is predicted to be preferred for the given time. In this situation, the survival function indicates that the occupant is comfortable in a sitting position in the cluster and is likely to remain in the sitting position. When the respective survival function approximates an initial cluster score that is less than the threshold score or has a slope that is greater than or equal to the slope threshold, the cluster is predicted to be nonpreferred for the given time. In this situation, the survival function indicates that the occupant is uncomfortable in a sitting position in the cluster and/or is unlikely to remain in the sitting position. The score threshold and the slope threshold can be specified by a vehicle and/or component manufacturer based on, e.g., minimizing a number of misclassified sitting positions, maximizing occupant comfort, etc.

Training data for the machine-learning algorithm can be generated by experiments surveying occupants about comfort, e.g., while shifting between different sitting positions. For example, the training data can be generated by recording a series of the pressure maps 104 of occupants and prompting the occupants to answer whether the sitting position is suitable or unsuitable, e.g., comfortable or uncomfortable, while the occupants operate a vehicle 100. To determine whether the sitting position is comfortable or uncomfortable, the occupant provides an input specifying the sitting score for the sitting position, as discussed above. If the specified sitting score is greater than or equal to the threshold score, then the sitting position is classified as preferred in the training data. If the specified sitting score is less than the threshold score, then the sitting position is classified as nonpreferred in the training data.

Additionally, training data for the machine-learning algorithm can be generated by experiments surveying occupants about comfort, e.g., while remaining seated, e.g., in one sitting position, in sitting positions in one cluster, for various sitting times. For example, the training data can be generated by prompting the occupants to answer whether one sitting position is comfortable or uncomfortable after various sitting times while the occupants drive a vehicle 100. Sitting times for respective sitting states can be associated with specified sitting scores in the training data.

In operation, the computer 102 receives a series of pressure maps 104 indicating respective sitting positions of the occupant, including a current sitting position. The computer 102 determines whether the sitting position of the occupant has changed. The computer 102 can determine whether the current pressure map 104 indicates a different sitting position than a previous most recent pressure map 104. For example, the computer 102 can determine whether any of the values for pressure in the pressure map 104 have changed by more than a pressure threshold. The pressure threshold can be chosen based on, e.g., a known level of noise of the pressure sensor 122, e.g., determined from empirical testing, specified by a sensor manufacturer, etc.

Upon determining that the sitting position has changed, the computer 102 updates the profile to include the immediately previous sitting position, i.e., the sitting position that the occupant just transitioned away from. The computer 102 also stores data related to that sitting position including the sitting score for that sitting position, and the current sitting position that the occupant just transitioned into. This data will be used when assigning the immediately previous sitting position into one of the clusters and updating the matrix T.

The computer 102 determines whether the immediately previous sitting position is sufficiently similar to any of the clusters in the profile. The computer 102 can calculate similarity measures between the current pressure map 104 and each cluster in the profile. If the highest similarity measure is above a threshold similarity, then the immediately previous sitting position is sufficiently similar to the corresponding cluster; otherwise, the immediately previous sitting position is not sufficiently similar to any of the clusters. The similarity threshold can be chosen, e.g., experimentally by surveying occupants about comfort while shifting between different sitting positions, e.g., as described above with respect to the training data, and identifying a value of a similarity measure at which opinions on comfort change, e.g., a value of a similarity measure resulting in clusters in the training data having sitting positions that are nearly uniformly classified by the responding occupants as comfortable or as uncomfortable, i.e., the clusters are nearly uniformly preferred or nonpreferred, e.g., at least a threshold proportion of each cluster is preferred or is nonpreferred. The threshold proportion can be chosen to be close to uniform while accounting for outliers, e.g., 95%. One example of a similarity measure is Kullback-Liebler divergence:

$$D_{KL}(P \| Q) = \sum_{x \in X} P(x) \log\left(\frac{P(x)}{Q(x)}\right)$$

in which x is a variable representing the positions of the pressure map 104, P is the pressure map 104 represented as a probability distribution of values of pressure over x, and Q is the centroid of the cluster of interest represented as a probability distribution. The centroid of a cluster is a pressure map 104 in which the value of pressure at each location is the average of the pressures at that location over the pressure maps 104 in that cluster. Another example of a similarity measure is cosine similarity, which is an inner product between the pressure map 104 and the centroid of the cluster of interest, both represented as vectors:

$$\text{similarity} = \frac{A \cdot B}{\|A\| \|B\|}$$

in which A is the pressure map 104 represented as a vector, and B is the centroid of the cluster of interest. Other similarity measures could instead be used, e.g., Euclidean distance to the centroid, Mahalanobis distance to the centroid, etc. In response to at least one of the similarity measures between the immediately previous sitting position and each of the clusters being above the threshold similarity, the computer 102 assigns the immediately previous sitting position into one of the clusters based on the similarity measures between that sitting position and each of the clusters, specifically, into the cluster with which that sitting position has highest similarity measure. If a sitting score for that sitting position is greater than or equal to the threshold score, the computer 102 assigns that sitting position into the cluster classified as preferred that has the highest similarity measure. The probabilities in the matrix T are also updated.

In response to none of the similarity measures between the immediately previous sitting position and each of the clusters being above the threshold similarity, the computer 102 creates a new cluster and assigns the immediately previous sitting position into the new cluster. The cluster can be classified as preferred if a sitting score for that sitting position is at least equal to the threshold score and as nonpreferred otherwise. The computer 102 combines any pairs of clusters that overlap with each other into a single cluster. Combining two clusters into a single cluster only occurs if the two clusters are both classified as preferred or both classified as nonpreferred. The matrix T is updated accordingly.

The computer 102 can combine the clusters based on determining the profile is due for updating. For example, the computer 102 can determine whether a threshold updating time has elapsed since the last update, i.e., since the last time that the computer 102 combined clusters. The threshold updating time can be chosen to be sufficiently long that an overlap between two clusters is likely to have arisen.

Upon determining that the sitting position has not changed, the computer 102 identifies the cluster to which the current pressure map 104 belongs. The computer 102 can determine to which cluster the current pressure map 104 has the highest similarity measure, using the same similarity measure as used above. The computer 102 determines whether the identified cluster is classified as preferred or nonpreferred.

If the current sitting position is in one of the clusters that is classified as preferred, the computer 102 maintains the physical configuration of the seat 106. Additionally, the computer 102 can predict a future time at which the cluster will be nonpreferred based on a survival function for the cluster. For example, the computer 102 can extrapolate the survival function, e.g., according to known data processing techniques. The computer 102 can then compare the extrapolated survival function to the threshold score. For example, the computer 102 may overlay a constant function defined by the threshold score onto the extrapolated survival function. In such an example, the computer 102 can determine the future time from the intersection of the constant function and the extrapolated survival function. Upon predicting the future time at which the cluster will be nonpreferred, the computer 102 can then instruct the seat actuators 118 and/or the bladders 120 to adjust the physical configuration of the seat 106, e.g., to adjust at least one of the tilt of the seat 106, the height of the seat 106, the recline angle of the seat 106, or the lumbar support position of the seat 106, and/or to adjust one or more of the fill levels of the bladders 120, in a way that encourages the occupant to change sitting positions at the future time. For example, the computer 102 can actuate the actuators 118 and/or the bladders 120 to adjust the physical configuration of the seat 106 over a period of time from a current time to the future time. That is, the computer 102 can adjust the physical configuration of the seat 106 in a way that encourages the occupant to transition from a current sitting position to an updated sitting position over the period of time.

Adjusting the physical configuration of the seat 106, i.e., selecting which and how much to actuate the seat actuators 118 and/or bladders 120, is based on the cluster into which the identified cluster is most likely to transition. For example, the computer 102 can adjust the physical configuration in a way that encourages the occupant to transition from the identified cluster to the most-likely-transition cluster.

The cluster into which the identified cluster is most likely to transition can, for example, be determined based on the cluster being sufficiently similar to the identified cluster. For example, the computer 102 can determine a cluster similarity measure between the cluster and the identified cluster, e.g., in substantially the same manner as discussed above regarding the similarity measure between a sitting position and a cluster. If the cluster similarity measure is above the threshold similarity (as discussed above), then the cluster is sufficiently similar to the identified cluster; otherwise, the cluster is not sufficiently similar to the identified cluster. In response to at least one cluster similarity measure between the identified cluster and each of the clusters being above the threshold similarity, the computer 102 can determine the most-likely-transition cluster is the cluster with which the identified cluster has a highest cluster similarity measure.

As another example, the cluster into which the identified cluster is most likely to transition can be determined according to the matrix T. As another example, the computer 102 can calculate or approximate a stationary matrix $T_s$ representing the probabilities of being in each cluster after an arbitrarily long period of time:

$$T_s = \lim_{k \to \infty} T^k = \begin{bmatrix} p_1 & p_2 & \cdots & p_N \\ p_1 & p_2 & \cdots & p_N \\ \vdots & \vdots & & \vdots \end{bmatrix}$$

in which $p_i$ is the probability of being in the ith cluster after an arbitrarily long period of time. The entries in a column all converge to the same value $p_i$. The stationary matrix $T_s$ can be approximated by raising the matrix T to a large power, e.g., $T^{10}$. The computer 102 can adjust the physical configuration in a way that encourages the occupant to sit in the most-likely cluster, i.e., the cluster of the largest value of $p_i$ in the stationary matrix $T_s$. The computer 102 can use the output of a machine-learning algorithm that classifies the possible physical configurations of the seat 106 according to which cluster they are most likely to encourage the occupant to transition to, e.g., naive Bayesian, nearest neighbor, polynomial classifiers, artificial neural networks, etc.

Training data for the machine-learning algorithm can be generated by, e.g., experiments in which the seat 106 is changed to different physical configurations while recording the pressure maps 104 showing how the sitting positions of the occupants change. The training data thus includes physical configurations of the seat 106 and corresponding current and subsequent sitting positions, from which the machine-learning algorithm can learn which physical configuration can produce the subsequent sitting position given the current sitting position. When executing the machine-learning algorithm, the subsequent sitting position is selected from the matrix T based on the current sitting position. Alternatively, the most-likely-transition cluster can be used as described above only if that cluster is classified as preferred. If the most-likely transition cluster is classified as nonpreferred, the same procedure can be used but with the most-likely cluster, i.e., the cluster of the largest value of $p_i$ in the stationary matrix $T_s$, instead of the most-likely-transition cluster.

If the current sitting position is in one of the clusters that is classified as nonpreferred, the computer 102 instructs the seat actuators 118 and/or the bladders 120 to adjust the physical configuration of the seat 106, e.g., in substantially the same manner as discussed above.

Figure 5:
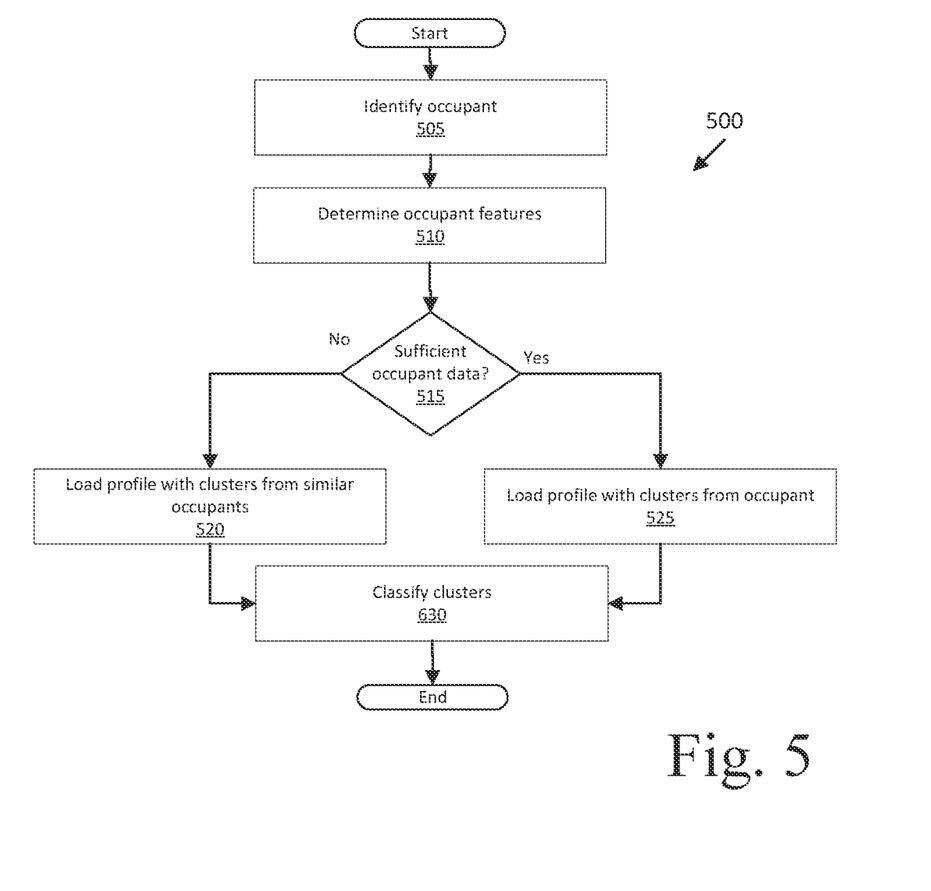
FIG. 5 is a process flow diagram of an example process for initializing a profile of the sitting positions for the occupant.

FIG. 5 is a process flow diagram illustrating an exemplary process 500 executed in a computer 102 according to program instructions stored in a memory thereof for initializing the profile of the sitting positions of the occupant. Process 500 includes multiple blocks that can be executed in the illustrated order. Process 500 could alternatively or additionally include fewer blocks or can include the blocks executed in different orders. As a general overview of the process 500, the computer 102 identifies the occupant, determines occupant features such as vehicle type and demographic information, loads the profile either with clusters of the occupant's sitting positions or sitting positions of similar occupants depending on whether sufficient data has been gathered about the sitting positions of the occupant, and classifies the clusters in the profile as preferred or nonpreferred.

The process 500 begins in a block 505. In the block 505, the computer 102 identifies the occupant, as discussed above. The process 500 continues in a block 510.

In the block 510, the computer 102 determines a plurality of features of the occupant, i.e., facts specific to the occupant, as discussed above. The process 500 continues in a block 515.

In the block 515, the computer 102 determines whether sufficient data about the sitting positions of the occupant have been collected for the profile to be based on only the occupant's data, as discussed above. If insufficient data has been gathered, the process 500 proceeds to a block 520. If sufficient data has been gathered, the process 500 proceeds to a block 525.

In the block 520, the computer 102 loads a profile for the occupant having clusters of the sitting positions of the occupant and the sitting positions of a plurality of other occupants. The clusters can be based on the sitting positions of only other occupants having the same features as the occupant, e.g., a same vehicle type and same demographic information, as discussed above. The process 500 continues in a block 530.

In the block 525, the computer 102 loads a profile for the occupant having clusters based wholly on the sitting positions of the occupant, i.e., not on any other occupants. The process 500 continues in the block 530.

In the block 530, the computer 102 classifies each cluster in the loaded profile as preferred or nonpreferred, e.g., using a machine-learning algorithm trained to accept sitting scores for respective sitting positions in the same cluster, as discussed above. Additionally, or alternatively, the computer 102 can determine survival functions for respective clusters, e.g., based on output from the machine-learning algorithm, as discussed above. The process 500 ends following the block 530.

Figure 6:
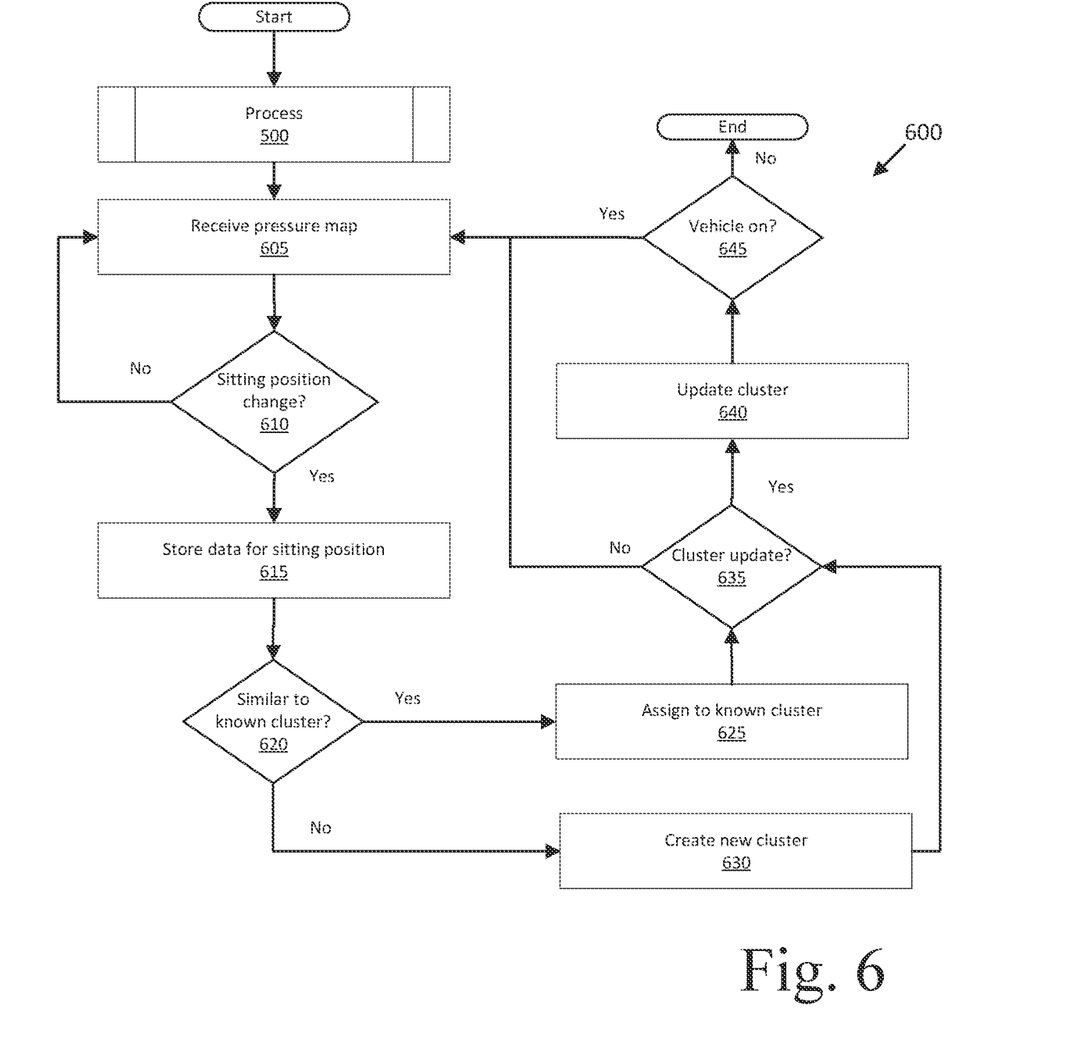
FIG. 6 is a process flow diagram of an example process for updating the profile.

FIG. 6 is a process flow diagram illustrating an exemplary process 600 executed in a computer 102 according to program instructions stored in a memory thereof for updating the profile of the occupant. Process 600 includes multiple blocks that can be executed in the illustrated order. Process 600 could alternatively or additionally include fewer blocks or can include the blocks executed in different orders. The process 600 can begin, e.g., when the vehicle 100 starts and continue for as long as the vehicle 100 is on. As a general overview of the process 600, the computer 102 loads the profile and receives a series of the pressure maps 104. Each time the sitting position of the occupant changes, the computer 102 stores data about the sitting position and, depending on whether a similarity measure between the sitting position and the closest cluster is greater than a threshold, adds the sitting position to the closest cluster or creates a new cluster. Periodically, the computer 102 updates the clusters by combining or splitting them.

The process 600 begins by performing the process 500 described above to load the profile for the occupant.

Next, in a block 605, the computer 102 receives a current pressure map 104 from the pressure sensors 122, as discussed above. The process 600 continues in a block 610.

In the block 610, the computer 102 determines whether the sitting position of the occupant has changed, e.g., based on comparing a current pressure map 104 with a previous most recent pressure map 104, as discussed above. If the sitting position has not changed, the computer 102 updates a sitting time for the sitting position and provides the updated sitting time to the machine-learning algorithm, e.g., to update the survival function for the cluster. The process 600 then returns to the block 605 to receive the next current pressure map 104. As the process 600 cycles between the blocks 605 and 610, the computer 102 receives the series of pressure maps 104. If the sitting position has changed, the computer 102 resets the sitting time for the sitting position. The process 600 then continues in a block 615.

In the block 615, the computer 102 updates the profile to include data related to the immediately previous sitting position, i.e., the sitting position that the occupant just transitioned away from, as discussed above. The process 600 continues in a block 620.

In the block 620, the computer 102 determines whether the immediately previous sitting position is sufficiently similar to any of the clusters in the profile, e.g., based on one or more similarity measures, as discussed above. In response to at least one of the similarity measures between the immediately previous sitting position and each of the clusters being above the threshold similarity, the process 600 continues in a block 625. In response to none of the similarity measures between the immediately previous sitting position and each of the clusters being above the threshold similarity, the process 600 continues in a block 630.

In the block 625, the computer 102 assigns the immediately previous sitting position into one of the clusters based on the similarity measures between that sitting position and each of the clusters, specifically, into the cluster with which that sitting position has highest similarity measure. If the sitting score for that sitting position is greater than or equal to a threshold score, the computer 102 assigns that sitting position into the cluster classified as preferred that has the highest similarity measure. The probabilities in the matrix T are also updated. The process 600 continues to a block 635.

In the block 630, the computer 102 creates a new cluster and assigns the immediately previous sitting position into the new cluster. The cluster can be classified as preferred if the sitting score for that sitting position is at least equal to the threshold score and as nonpreferred otherwise, as discussed above. The process 600 continues to the block 635.

In the decision block 635, the computer 102 determines whether the profile is due for updating, e.g., based on expiration of a timer having a duration equal to a threshold updating time, as discussed above. If the profile is not due for updating, the process 600 returns to the block 605 to continue receiving the series of pressure maps 104. If the profile is due for updating, the process 600 continues in a block 640.

In the block 640, the computer 102 updates the clusters, e.g., by combining any pairs of clusters that overlap with each other into a single cluster, as discussed above. The matrix T is updated accordingly. The process 600 continues in a block 645.

In the block 645, the computer 102 determines whether the vehicle 100 is still on. If the vehicle 100 is still on, the process 600 returns to the block 605 to continue receiving the series of pressure maps 104. If the vehicle 100 has been turned off, the process 600 ends.

Figure 7:
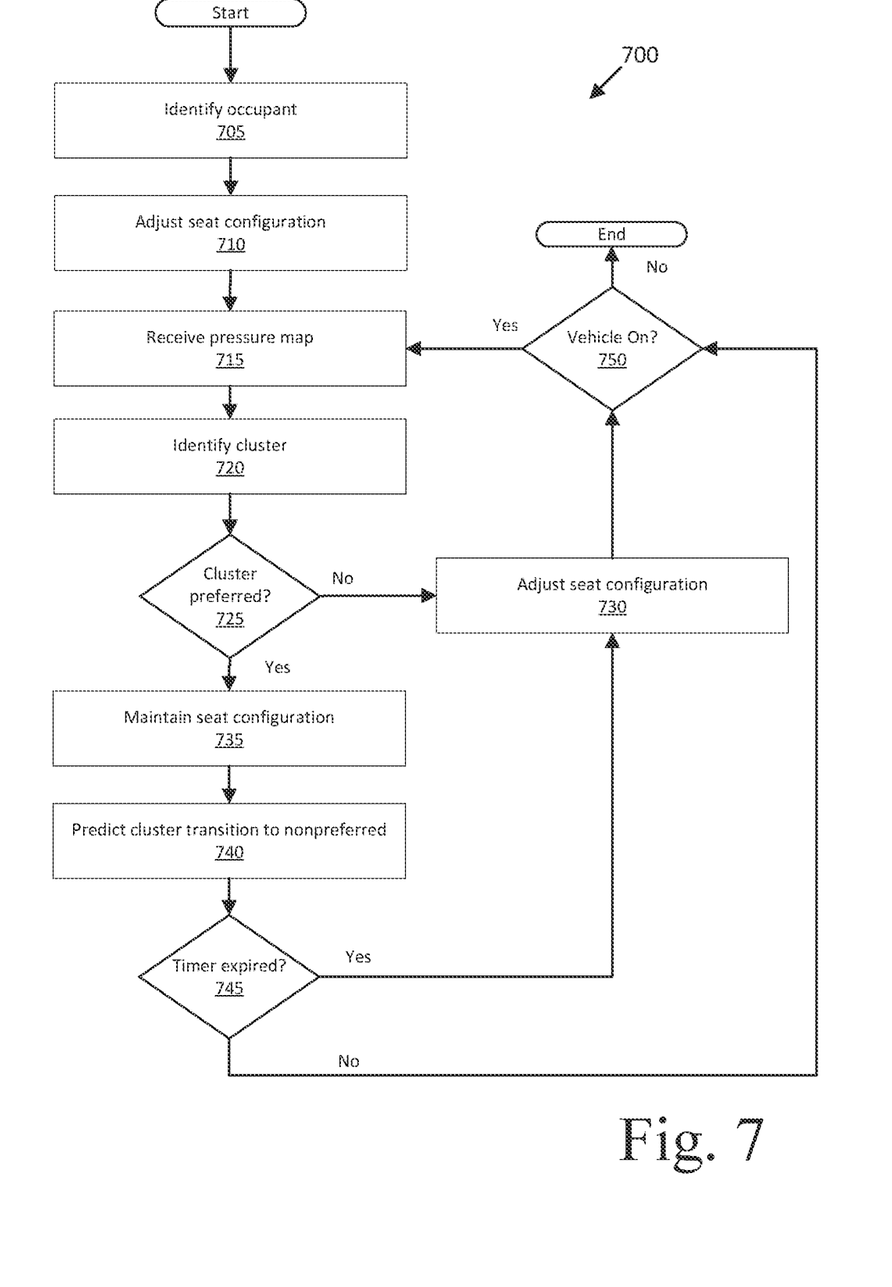
FIG. 7 is a process flow diagram of an example process for adjusting a physical configuration of the seat.

FIG. 7 is a process flow diagram illustrating an exemplary process 700 executed in a computer 102 according to program instructions stored in a memory thereof for adjusting the physical configuration of the seat 106. Process 700 includes multiple blocks that can be executed in the illustrated order. Process 700 could alternatively or additionally include fewer blocks or can include the blocks executed in different orders. The process 700 can run concurrently with the process 600 and can continue running for as long as the vehicle 100 is on. As a general overview of the process 700, the computer 102 identifies the occupant, receives the current pressure map 104, identifies the cluster to which the pressure map 104 belongs, and, if that cluster is nonpreferred, adjusts the seat 106 configuration to encourage the occupant into a different sitting position.

The process 700 begins in a block 705. In the block 705, the computer 102 identifies the occupant, as discussed above. The process 700 continues in a block 710.

In the block 710, the computer 102 instructs the seat actuators 118 and/or the bladders 120 to adjust the physical configuration of the seat 106, e.g., based on a most-likely cluster. For example, the computer 102 can calculate or approximate a stationary matrix T s representing the probabilities of being in each cluster after an arbitrarily long period of time, as discussed above. The process 700 continues in a block 715.

In the block 715, the computer 102 receives the current pressure map 104 from the pressure sensors 122, as discussed above. The process 700 continues in a block 720.

In the block 720, the computer 102 identifies the cluster to which the current pressure map 104 belongs, e.g., based on the one or more similarity measures, as discussed above. The process 700 continues in a block 725.

In the block 725, the computer 102 determines whether the cluster identified in the block 720 is classified as preferred or nonpreferred. If the current sitting position is in one of the clusters that is classified as nonpreferred, the process 700 continues in a block 730. If the current sitting position is in one of the clusters that is classified as preferred, the process 700 continues in a block 735.

In the block 730, the computer 102 instructs the seat actuators 118 and/or the bladders 120 to adjust the physical configuration of the seat 106. The computer 102 can adjust the physical configuration in a way that encourages the occupant to transition from the identified cluster to the most-likely-transition cluster, as discussed above. The process 700 continues in the block 750.

In the block 735, the computer 102 instructs the seat actuators 118 and/or the bladders 120 to maintain the physical configuration of the seat 106. The process 700 continues in a block 740.

In the block 740, the computer 102 predicts a future time at which the cluster including the current sitting position will be nonpreferred based on the survival function for the cluster, as discussed above. The process 700 continues in a block 745.

In the block 745, the computer 102 determines whether a timer has expired. For example, the computer 102 can initiate a timer upon predicting the future time at which the cluster including the current sitting position will be nonpreferred. The computer 102 may set the duration of the timer based on, e.g., a difference between a current time and the predicted future time, etc. If the timer has expired, then the process 700 returns to the block 730. If the timer has not expired, then the process 700 continues in the block 750.

In the block 750, the computer 102 determines whether the vehicle 100 is still on. If the vehicle 100 is still on, the process 700 returns to the block 715 to continue receiving the series of pressure maps 104. If the vehicle 100 has been turned off, the process 700 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer including a processor and a memory storing instructions executable by the processor to:
   store a profile for an occupant, wherein the profile includes a plurality of clusters of sitting positions for the occupant in a seat, and classifications of respective clusters as preferred or nonpreferred;
   classify respective clusters as preferred or nonpreferred based on sitting scores for the respective sitting positions in that cluster, wherein a higher sitting score increases a likelihood of the classification being preferred;
   receive a series of pressure maps indicating a respective series of sitting positions of the occupant in the seat, wherein the pressure maps include a current pressure map;
   assign one of the sitting positions to one of the clusters that is classified as preferred in response to the sitting score of that sitting position being greater than a threshold score; and
   adjust a physical configuration of the seat in response to a current sitting position being in one of the clusters that is classified as nonpreferred.

2. The system of claim 1, wherein the instructions further include instructions to determine the sitting scores for the respective sitting positions based on occupant input data.

3. The system of claim 2, wherein the instructions further include instructions to request the occupant input based on expiration of a timer.

4. The system of claim 2, wherein the instructions further include instructions to request the occupant input based on detecting the current sitting position has changed.

5. The system of claim 1, wherein the instructions further include instructions to:
predict one of the clusters into which the cluster including the current sitting position is most likely to transition based on one of a matrix of probabilities of transition from respective clusters into respective other clusters or cluster similarity measures between the cluster including the current sitting position and respective other clusters, wherein the matrix is based on the series of pressure maps; and
adjust the configuration of the seat based on the predicted one of the clusters.

6. The system of claim 1, wherein the instructions further include instructions to:
in response to the current sitting position being in one of the clusters that is classified as preferred, predict that cluster will be nonpreferred after a period of time based on a survival function for that cluster, wherein the survival function determines a probability that that cluster will be preferred after the period of time; and
adjust the configuration of the seat based on the prediction.

7. The system of claim 6, wherein the period of time specifies an amount of time that the occupant has remained in the current sitting position.

8. The system of claim 6, wherein the period of time specifies an amount of time that the occupant has remained in one or more sitting positions in the cluster including the current sitting position.

9. The system of claim 6, wherein the period of time specifies an amount of time that the occupant has remained in the seat.

10. The system of claim 1, wherein the instructions include instructions to combine two clusters into a single cluster based on overlap between the two clusters and the two clusters having a same classification.

11. The system of claim 1, wherein the instructions include instructions to assign each of the series of sitting positions into one of the clusters based on similarity measures between that sitting position and each of the clusters.

12. The system of claim 11, wherein the instructions include instructions to, in response to none of the similarity measures between one of the sitting positions and each of the clusters being above a threshold similarity, create a new cluster and assign that sitting position into the new cluster.

13. The system of claim 1, wherein the clusters are based on the sitting positions of a plurality of other occupants.

14. The system of claim 13, wherein the instructions include instructions to determine a plurality of features of the occupant, and the clusters are based only on the sitting positions of the occupant and other occupants having the same features as the occupant.

15. The system of claim 14, wherein the features include a vehicle type in which the respective occupants were sitting in the sitting positions.

16. The system of claim 14, wherein the features include demographic information about the occupants.

17. The system of claim 13, wherein the clusters are based at least in part on the sitting positions of the other occupants until a collection distance or collection time of the series of pressure maps of the occupant increases above a respective distance threshold or time threshold, after which the clusters are based wholly on the series of sitting positions of the occupant.

18. A system comprising:
a seat having a physical configuration that is adjustable; and
a computer communicatively coupled to the seat;
wherein the computer is programmed to:
store a profile for an occupant, wherein the profile includes a plurality of clusters of sitting positions for the occupant in a seat, and classifications of respective clusters as preferred or nonpreferred;
classify respective clusters as preferred or nonpreferred based on sitting scores for the respective sitting positions in that cluster, wherein a higher sitting score increases a likelihood of the classification being preferred;
receive a series of pressure maps indicating a respective series of sitting positions of the occupant in the seat, wherein the pressure maps include a current pressure map;
assign one of the sitting positions to one of the clusters that is classified as preferred in response to the sitting score of that sitting position being greater than a threshold score; and
adjust a physical configuration of the seat in response to a current sitting position being in one of the clusters that is classified as nonpreferred.

19. The system of claim 17, wherein the physical configuration includes at least one of a tilt of the seat, a height of the seat, a recline angle of the seat, a lumbar support position of the seat, or a fill level of a bladder supported by the seat.

20. A method comprising:
storing a profile for an occupant, wherein the profile includes a plurality of clusters of sitting positions for the occupant in a seat, and classifications of respective clusters as preferred or nonpreferred;
classifying respective clusters as preferred or nonpreferred based on sitting scores for the respective sitting positions in that cluster, wherein a higher sitting score increases a likelihood of the classification being preferred;
receiving a series of pressure maps indicating a respective series of sitting positions of the occupant in the seat, wherein the pressure maps include a current pressure map;
assigning one of the sitting positions to one of the clusters that is classified as preferred in response to the sitting score of that sitting position being greater than a threshold score; and
adjusting a physical configuration of the seat in response to a current sitting position being in one of the clusters that is classified as nonpreferred.

* * * * *